United States Patent Office 3,346,444
Patented Oct. 10, 1967

3,346,444
ELECTRICALLY CONDUCTIVE POLYMERS AND
PROCESS OF PRODUCING THE SAME
John H. Lupinski, Scotia, and Kenneth D. Kopple,
Schenectady, N.Y., assignors to General Electric
Company, a corporation of New York
No Drawing. Filed Aug. 24, 1964, Ser. No. 391,764
11 Claims. (Cl. 161—213)

ABSTRACT OF THE DISCLOSURE

The conductive polymers are mixtures of 7,7,8,8-tetracyanoquinodimethan and a soluble polymer having quaternary nitrogen cationic groups and an anion of 7,7,8,8-tetracyanoquinodimethan.

This invention relates to polymeric compositions possessing electronically conductive properties and to a process of producing such compositions. More particularly, this invention relates to a composition comprising a salt whose cation moiety is a soluble polymer having quaternary nitrogen cationic groups and whose anion moiety is the anion of 7,7,8,8-tetracyanoquinodimethan, said salt also containing a sufficient quantity of 7,7,8,8-tetracyanoquinodimethan to give a composition having a conductivity greater than $10^{-10}$ mho/centimeter, and to a process of producing such compositions.

Synthetic polymers, as a general class, are electrical insulators. In fact, it was this property which gave birth and strong impetus to the development of the synthetic polymer industry since there was a need for materials which could be used as electrical insulation. With the development of the electrical industry, need arose for materials which, although not as good conductors as metals, would have conductive properties which could be used, for example, as corona shields, or could be incorporated as a separate layer to the insulation to prevent corona discharge which was undesirable since it caused complete breakdown of the electrical insulation. Also, with the development of the synthetic polymer industry, use of these materials in applications other than electrical applications arose for decorative and utilitarian purposes. Because of their electrical insulating properties, the articles fabricated from synthetic polymers have the annoying property of building up static charges on their surface which tends to collect dust from the air. Many attempts have been made to provide such articles with a surface which would dissipate the electrostatic charge so that the articles would not be so prone to collect dust on their surface. Conductive surfaces are also desirable for electroplating non-conductors for decorative and utilitarian purposes, e.g., printed circuit boards. Applications have also arisen where it is desirable to make compositions which have a particular conductivity so as to control the amount of electric current flowing in the circuit incorporating such a composition.

Many attempts have been made to develop synthetic polymers which would be electronically conductive. When synthetic ion exchange resins were developed, it was hoped that these products would find applications for conductive polymers. However, it was soon discovered that under the influence of an electrical potential much of the conductivity was ionic, in which the ionic groups of the polymer migrated either toward the anode or cathode depending upon the particular charge of the ionic group in the polymer. This was an undesirable property since it depleted the ionic groups from the internal structure of the polymer with a consequent increase in resistance and degradation of the polymer.

Other approaches to the problem have been to incorporate metallic or other conductive fillers such as carbon blacks in polymers, to produce compositions having conductive properties. Since the amount of filler determines the conductivity of the composition, the conductivity of such compositions is dependent upon the highest amount of the conductive filler which can be incorporated in the composition without adversely affecting the mechanical properties of the composition. These compositions also have the disadvantage in that although they are electrical conductors they also have some electrical resistance which generates heat in the composition on the passage of electrical current. On heating, these compositions expand, which in effect moves the conductive particles further apart, decreasing the conductivity of the composition and correspondingly increasing the resistance which in turn has the effect of producing more heat until the compositions fail due to thermal decomposition.

We have now discovered that electronically conductive polymers whose conductivity increases with temperature can be made using the unique compound 7,7,8,8-tetracyanoquinodimethan, hereinafter, for the sake of brevity, designated as TCNQ. This compound, its preparation and its salt-forming properties, are described in J. Am. Chem. Soc., 84, 3370–3387 (1962). We have found that soluble polymers having quaternary nitrogen cationic groups, i.e., polymers having quaternized tertiary amnie groups, will react with a soluble salt of TCNQ to form a polymer-TCNQ salt. These polymeric salts so produced are not themselves electronically conductive to any degree, but we have found that if free TCNQ is now added to these polymeric salts, the electrical conductivity is increased. When the amount of TCNQ is greater than 2% by weight of the total weight of the composition, usually 4% or greater, the conductivity of these polymeric salts suddenly increases to produce a composition having a conductivity greater than $10^{-10}$ mho/centimeter. For most applications, it is desirable to use these compositions as films or coatings. Therefore, the molecular weight of the polymers should be great enough that the polymers have film forming properties.

Polymers having quaternary nitrogen cationic groups can be produced by a wide variety of methods. The polymer should be soluble (i.e., it should not be cross-linked and therefore not capable of being dissolved) in some solvent. Generally, the soluble polymers are essentially linear in nature although some chain branching may be present, and are thermoplastic or fusible. For example, soluble resins may be made by polymerization of a monovinyl monomer containing a basic tertiary nitrogen group, for example, vinyl pyridine, dialkylamino styrenes, N-vinyl imidazole, etc., or by polymerization of monomers which on polymerization produce polymers having a basic primary or secondary amine group, for example, ethyleneimine, etc., which can be alkylated to a tertiary amine group by well known techniques, e.g., by reacting with alkyl halides, dialkyl sulfates, etc. These polymers are then quaternized by well known techniques to convert the basic amino group of the polymer into a quaternary nitrogen cationic group, for example, by reaction with an alkyl halide, e.g., methyl iodide, ethyl iodide, propyl iodide, butyl iodide, hexyl iodide, octyl iodide, etc., or their corresponding chlorides or bromides, or by reaction with a dialkyl sulfate, e.g., dimethyl sulfate, diethyl sulfate, ethylmethyl sulfate, dipropyl sulfate, dibutyl sulfate, dioctyl sulfate, etc. Since the particular alkyl group introduced into the quaternary nitrogen cationic groups has little, if any, influence on the conductivity of the final composition, we generally prefer to use the more readily available, lower cost quaternizing agents which introduce alkyl groups of from 1 to 8 carbon atoms, although other well known quaternizing agents are satisfactory. In the case of polymers containing primary or secondary amines, alkylation to a tertiary amine and quaternization can be carried out as a single step, i.e., by exhaustive alkylation, since the same reagent is used for both reactions. Generally, sufficient quaternizing agent is used to convert essentially all of the amino groups of the polymer to quaternary nitrogen cationic groups. However, we have prepared polymers with very good electronic conductivity where only 15% of the tertiary amine groups have been quarternized.

Other means of producing polymers having quarternary nitrogen cationic groups is to form a soluble polymer which can then be reacted to introduce quarternary nitrogen cationic groups, for example, by reaction of tertiary amines with polymers containing halomethyl groups, e.g., halomethylated polystyrene resins, halomethylated polyphenylene ethers, as disclosed and claimed in Hay application, Ser. No. 155,829, filed Nov. 29, 1961, and the polyphenylene ethers which are reacted with various reagents to introduce nuclear-substituted quarternary nitrogen cationic groups, disclosed and claimed in Borman application, Ser. No. 155,826, now Patent No. 3,226,361 filed Nov. 29, 1961, both of which are assigned to the same assignee as the present invention. Polymers containing nitrile groups can be reduced, for example, with Li-Al hydride, to polymers containing a primary amine group.

The quarternary nitrogen cationic group of the soluble polymer may be in the form of its acid salt, or the free base. Since the preparation of the latter involves an additional preparation step which serves no useful purpose, we prefer to use those polymers where the quaternized nitrogen cationic group is in the form of an acid salt, e.g., the halide, sulfate, methyl sulfate, aryl sulfonate, etc., salt. These polymers readily react with a soluble TCNQ salt, the most readily available soluble TCNQ salt being the lithium salt of TCNQ, to form the polymer-TCNQ salt plus the lithium salt of the acid if the quaternary nitrogen cationic group was in the form of an acid salt, or lithium hydroxide if it was present in the form of the free base. Since the TCNQ ion present in solutions of metal salts of TCNQ, especially aqueous solutions of lithium TCNQ, is susceptible to oxygen, deaerated solvents are used in making the solutions and an inert atmosphere, e.g., nitrogen, argon, etc., is maintained over those reaction mixtures where these metal salts of TCNQ are present. Generally, when dealing with a soluble polymer, it is desirable to dissolve the polymer in a solvent and add a solution of the TCNQ salt. Water, ethyl alcohol or mixtures thereof are convenient solvents for carrying out of this reaction, since the polymer-TCNQ salt precipitates, leaving the lithium salt produced in solution. However, solvents in which the polymer-TCNQ salt is soluble and the metal salt produced is insoluble may also be used or solvents in which both products are soluble but from which one of the products can be extracted or otherwise separated may likewise be used. The polymer-TCNQ salts are soluble in readily available solvents, e.g., acetonitrile, dimethyl formamide, etc. They may be dissolved and mixed with a solution of free TCNQ to incorporate the TCNQ into the polymer-TCNQ salt, or the free TCNQ, either as a solid or in solution, may be mixed by mulling, grinding, blending, etc., with the solid polymeric salt. To obtain compositions of uniform conductivity throughout the composition, the mixtures of the TCNQ and the polymer-TCNQ salt should be of as uniform blend as possible. Since solutions of the polymers containing quaternary nitrogen cationic groups permit easier and, in general, more complete conversion of the polymer to the polymer-TCNQ salt and solutions of the polymer-TCNQ salt produce more intimate and uniform mixtures with the TCNQ, such techniques generally produce more uniformly conductive as well as more highly conductive compositions. Therefore, we prefer to use soluble polymers and to use solutions for making the polymer-TCNQ salt and the mixture of the latter with TCNQ.

The amount of free TCNQ to be incorporated in the polymeric TCNQ salt is dependent upon the particular conductivity desired. Generally, we have found that to obtain conductivities of greater than $10^{-10}$ mho/centimeter, a quantity greater than 2% by weight and generally 4% by weight of the composition should be added. The actual amount required depends upon the particular polymer, its degree of quaternization, etc. As the examples illustrate, the amount to be added is readily determined by preparing a series of blends of different amounts of TCNQ and measuring the conductivity of the various blends. A smooth curve drawn through the ascertained values permits determination of the conductivity of other concentrations of TCNQ. As the quantity of TCNQ increases, the conductivity correspondingly increases, up to quantities of about 15 to 25% by weight of the total composition, at which point the conductivity starts to decrease gradually, but even at concentrations as high as 40% by weight the conductivity is still greater than $10^{-10}$ mho/centimeter.

In addition to being able to vary the conductivity by varying the amount of TCNQ incorporated in a polymer-TCNQ salt, the conductivity can also be varied by the degree of quaternization of the tertiary amine groups in the ploymer. It can also be varied by the amount of quaternized nitrogen cationic groups which are converted to the TCNQ salt.

In addition to using the polymer -TCNQ salt containing free TCNQ as the sole component of the electronically conductive composition, we may incorporate these materials in non-conducting polymers, for example, by either copolymerization with another polymerizable monomer, e.g., styrene, acrylonitrile, ethyl acrylate, methyl methacrylate, etc., in preparing the initial amine polymer, or by mixing or blending with other thermoplastic polymers, for example, polyacrylonitrile, polyurethanes, polyethylene, polypropylene, polystyrene, polyethylacrylate, polymethyl methacrylate, etc., to increase the conductivity of such compositions. Compositions of polymeric urethanes, polymers of acrylonitrile, methacrylonitrile and vinyl pyridine, containing salts of TCNQ and free TCNQ are disclosed and claimed in the patent application of Lupinski and Hertz, Ser. No. 561,487, filed June 29, 1966 as a continuation-in-part of Ser. No. 391,-765 (now abandoned), filed simultaneously herewith, both of which are assigned to the same assignee as the present invention. Interesting compositions are prepared by incorporating a polymer-TCNQ salt mixture with TCNQ into elastomeric compositions, for example elastomeric polyurethanes, to produce compositions whose conductivity is not only dependent upon the amount of polymer-TCNQ salt-free TCNQ mixture incorporated in the composition, but also on the pressure or tension applied to such elastomeric compositions. In such elastomeric compositions, the conductivity increases as pressure is applied to the composition and decreases as tension is applied and the composition stretches. Such compositions, therefore, are useful in pressure and tension detecting applications.

Other modifications and uses will be apparent to those skilled in the art, from the above description and the following examples which are given by way of illustration only, and not by way of limitation. In all of the examples, parts and percentages are by weight, unless otherwise specified stated. All solutions of the lithium salt of TCNQ were prepared using deaerated solvents and a nitrogen atmosphere blanket maintained over the solutions until used, to minimize reaction of oxygen with the TCNQ ion.

*Example 1*

Poly(2-vinyl pyridine) was prepared by bulk polymerization of 40 ml. of 2-vinyl pyridine containing 0.05 g.

of azobisisobutyronitrile by heating at 50° C. A portion of this polymer was partially quaternized by reacting 10 g. of the polymer in 400 ml. of methanol with 10 g. of dimethyl sulfate at 60° C. for 2 days. The volume of the reaction mixture was reduced to one-half by vacuum distillation at room temperature and then diluted to 1 liter with water. To completely quaternize the polymer, 60 ml. of dimethylsulfate was added over a period of 3 hours and the pH was maintained greater than 8 by the addition of 5 N sodium hydroxide. Vigorous stirring was maintained throughout the reaction. This reaction was carried out at room temperature, although some heat was evolved by the reaction. An additional 10 ml. of dimethyl sulfate was added and stirring continued overnight, to insure complete quaternization of all of the nitrogen groups in the pyridine rings of the polymer to methyl pyridinium methyl sulfate groups.

The TCNQ salt of this fully quaternized polymer was prepared by reacting 1.68 g. of the fully quaternized polymer dissolved in a mixture of 140 ml. of water and 330 ml. of ethanol, with 2.11 g. of lithium salt of TCNQ dissolved in 60 ml. of ethanol. The reaction was carried out for 1 hour at room temperature, while maintaining the nitrogen atmosphere over the reaction mixture. To insure complete reaction, the reaction mixture was heated to 40° C. for 20 minutes and then cooled. After 1 hour, the polymer-TCNQ salt which had precipitated from the solution was separated by decanting the supernatant liquid. The precipitate was washed with 75% aqueous ethanol and then two times with 95% aqueous ethanol. The polymer-TCNQ salt was separated from the ethanol and dried. It was readily soluble in dimethylformamide and acetonitrile.

Solutions of approximately 10% concentration of the polymer-TCNQ salt in dimethylformamide were prepared. In various samples of this solution, TCNQ was dissolved in varying amounts and films cast from these solutions onto glass slides to give films containing various concentrations of TCNQ in the polymer-TCNQ salt. The conductivities of these films were measured with the results shown in Table I.

TABLE I

| Percent TCNQ in Film | Temperature, ° C. | | | |
|---|---|---|---|---|
| | 27 | 60 | 100 | 130 |
| | Conductivity, mho/centimeter | | | |
| 0 | <$10^{-10}$ | | | |
| 2.5 | <$10^{-10}$ | | | |
| 5.1 | $3.3 \times 10^{-6}$ | | | |
| 14.6 | $1.0 \times 10^{-4}$ | $2.1 \times 10^{-4}$ | $4.7 \times 10^{-4}$ | $7.6 \times 10^{-4}$ |
| 22.3 | $1.7 \times 10^{-4}$ | $3.4 \times 10^{-4}$ | $7.2 \times 10^{-4}$ | $1.1 \times 10^{-3}$ |
| 40.0 | $1.0 \times 10^{-5}$ | $2.7 \times 10^{-5}$ | $6.7 \times 10^{-5}$ | $1.2 \times 10^{-4}$ |

*Example 2*

Poly(2-vinyl pyridine) was quaternized with methyl iodide to yield a product in which 60% of the nitrogen atoms were quaternized. The procedure was as follows: 15 grams of poly(2-vinyl pyridine) dissolved in 300 ml. of methanol were heated to reflux with stirring; 25 ml. of methyl iodide were added and the reaction mixture heated for a period of 6 hours at reflux in the absence of light. At the end of this time, an additional 10 ml. of methyl iodide and 200 ml. of water were added. Heating at reflux was continued for an additional 24 hours and the mixture permitted to cool. The methanol was distilled from the reaction mixture by distillation under vacuum at 40° C. Additional water was added to dissolve the precipitate which had formed and the solution lyophilized (freeze-dried, i.e., the solution was frozen and the solvent evaporated under vacuum from the frozen mass). Analytical data showed that 60% of the nitrogen atoms had been quaternized. Although excess methyl iodide had been used, hydrogen iodide, formed by solvolysis of methyl iodide, had blocked some of the nitrogen atoms from being alkylated, by forming the hydrogen iodide salt. If this hydrogen iodide is not removed it will react with some of the lithium TCNQ salt to produce free TCNQ. This is one way of incorporating free TCNQ into the polymer-TCNQ salt so this side reaction can be used if desired to incorporate TCNQ into the polymer-TCNQ salt. However, the amount so incorporated is not determinable except by measuring the conductivity and interpolation from known conductivity versus TCNQ concentration curves.

In order to remove this hydrogen iodide as well as to replace the iodide ion on the quaternized nitrogen cationic group with chlorine, a solution of the polymer in water was poured through a column of an anion exchange resin in chloride form. The eluted solution was adjusted to a pH of 7, with sodium hydroxide, and dialyzed vs. water and then lyophilized to obtain the solid polymer-TCNQ salt. Analytical data again confirmed that 60% of the nitrogen atoms were quaternized.

The quaternized polymer was converted to the TCNQ salt by reacting 0.8 gram of the quaternized polymer in the chloride form dissolved in 80 ml. of absolute alcohol, which was mixed with a solution of 0.8 gram of the lithium salt of TCNQ dissolved in 100 ml. of absolute alcohol. A precipitate formed immediately on mixing of the two solutions. The reaction was allowed to continue for 30 minutes with stirring, after which the precipitate was removed by centrifugation, washed several times with absolute alcohol and finally with dry ether to yield 1.13 grams of the polymer-TCNQ salt.

Films of this polymer-TCNQ salt with various concentrations of TCNQ were prepared as in Example 1. The conductivities of these films are shown in Table II.

TABLE II

| Percent TCNQ in films: | Conductivity, mho/c.—27° C. |
|---|---|
| 0 | <$10^{-10}$. |
| 2.17 | <$10^{-10}$. |
| 4.83 | $4.2 \times 10^{-7}$. |
| 8.50 | $3.4 \times 10^{-5}$. |
| 15.00 | $1.0 \times 10^{-6}$. |

*Example 3*

Poly(2-vinyl pyridine) was quaternized to yield a product in which 15% of the nitrogen atoms were quaternized as follows: a solution of 1.8 grams of poly(2-vinyl pyridine) in 70 ml. of ethyl acetate and 100 ml. of nitromethane were reacted with 0.25 ml. of methyl iodide at room temperature in the absence of light for 3 days. The solution was concentrated to half its original volume and poured into 1 liter of an equal mixture of hexane and ether to precipitate the polymer. The polymer was reprecipitated by dissolving in 60 ml. of ethanol and pouring into 800 ml. of hexane. The precipitate was filtered from the solution and was dried for 48 hours at 100° C. in vacuum. Analysis showed one quaternized nitrogen group for each 6 unalkylated nitrogen groups in the polymer, indicating that approximately 15% of the nitrogen atoms had been quaternized.

This quaternized polymer was converted to the TCNQ salt by adding a solution of 0.562 g. of the quaternized polymer dissolved in a mixture of 70 ml. of alcohol and 10 ml. of distilled water to a solution of 0.213 g. of lithium salt of TCNQ dissolved in 50 ml. of alcohol. A nitrogen atmosphere was maintained over the reaction mixture. No precipitate formed, so 400 ml. of distilled water was added dropwise while stirring, still maintaining the nitrogen atmosphere over the reaction mixture. This caused a precipitate of the polymer-TCNQ salt to form which was removed by decanting the supernatant liquid. After drying, 0.42 g. of the polymer-TCNQ salt was obtained.

A film of this polymer containing 15% TCNQ was prepared as described in Example 1. It had a conductivity measured at 27° C. of 4×10⁻⁴ mho/centimeter.

*Example 4*

A copolymer of styrene and 2-vinyl pyridine was prepared by bulk polymerization of 20 ml. of styrene and 20 ml. of 2-vinyl pyridine containing 0.05 g. of azobisisobutyronitrile. This polymer was quaternized by reacting 4 g. of the polymer dissolved in a hot mixture of 80 ml. of ethyl acetate and 80 ml. of nitromethane with 15 ml. of n-butyl iodide. This solution was heated under reflux in the absence of light for 60 hours adding 40 ml. of nitromethane after 40 hours to keep the product in solution. The quaternized polymer was precipitated by adding 500 ml. of anhydrous ether. The isolated product was washed with additional ether, and dried in vacuum at 80° C. The yield was 5.4 g. of the quaternized polymer. Analytical data indicated that the polymer contained 1.2 polymeric units of styrene for each unit of polymer of vinyl pyridine and that 80% of the nitrogen atoms on the pyridine nuclei had been quaternized.

This quaternized polymer was converted to its TCNQ salt as follows. A solution of 1 g. of the quaternized polymer in a mixture of 125 ml. of alcohol and 100 ml. of distilled water was mixed with a solution of 0.5 g. of the lithium salt of TCNQ dissolved in a mixture of 40 ml. of alcohol and 20 ml. of distilled water, maintaining a nitrogen atmosphere. The mixture was stirred for 2 hours, by which time a polymer-TCNQ salt had precipitated. It was removed by centrifugation, washed with ethanol until the washings were colorless, then with ether and dried in vacuum. The yield was 0.718 g. of the polymer-TCNQ salt.

Films of this polymer-TCNQ salt containing various quantities of TCNQ were prepared as described in Example 1. The conductivities of these films are shown in Table III.

TABLE III

| Percent TCNQ in films: | Conductivity, mho/c.—27° C. |
|---|---|
| 0 | <10⁻¹⁰. |
| 3 | 1×10⁻¹⁰. |
| 6 | 3×10⁻⁹. |
| 10 | 6×10⁻⁵. |
| 15 | 1.1×10⁻³. |
| 20 | 1.1×10⁻⁴. |
| 25 | 1.0×10⁻⁴. |
| 30 | 3.0×10⁻⁵. |

*Example 5*

Poly(4-dimethylaminostyrene) was prepared by bulk polymerization at 100° C. of 5 g. of 4-dimethylaminostyrene containing 0.02 g. of azobisisobutyronitrile as the polymerization catalyst. The polymer was precipitated twice by pouring benzene solutions of the polymer into excess methanol. This polymer was quaternized by reacting a solution of 2.3 g. of the polymer in 100 ml. of ethyl acetate with 10 ml. of methyl iodide. The solution was heated under reflux. It became cloudy in a few minutes. Clarity was restored by the addition of 100 ml. of nitromethane but the solution again became cloudy after 30 minutes. Addition of 200 ml. of nitromethane did not remove the cloudiness. Heating was continued for 12 hours with the entire reaction being carried out in the absence of light. By this time, the quaternized polymer had precipitated completely from solution and was recovered by decanting of the supernatant liquid. The quaternized polymer was dissolved in water and dialyzed against a solution containing iodide and thiosulfate ions until almost colorless. This process caused precipitation of the polymer but dialysis against water restored solution. It was again dialyzed against a potassium iodide solution which caused precipitation of the polymer and was finally dialyzed again against water to remove all excess iodide. The resulting dialyzed solution was concentrated under reduced pressure at 80° C. The analytical data indicated that between 75 to 87% of the dimethylamino groups of the polymer had been quaternized.

This polymer was converted to its TCNQ salt by mixing a solution of 1 g. of the quaternized polymer in 75 ml. of distilled water with a solution of 0.65 g. of the lithium salt of TCNQ dissolved in 150 ml. of distilled water, the reaction being carried out under a nitrogen atmosphere. The reaction mixture was stirred for 30 minutes by which time the polymer-TCNQ salt had precipitated. The precipitate was removed by centrifugation and decantation and washed with alcohol and dried in vacuum. A yield of 1.14 g. of the polymer-TCNQ salt was obtained.

A film of this polymer-TCNQ salt containing 15% TCNQ was prepared as described in Example 1. The film had a conductivity of 2×10⁻³ mho/centimeter measured at 27° C.

*Example 6*

2,6-xylenol was polymerized to poly(2,6-dimethylphenylene)ether as described by Hay in J. Polymer Sci., 58, 581–591 (1962). The methyl groups of the polymer were chlorinated by passing chlorine into a carbon tetrachloride solution of the polymer heated to reflux temperature, while being irradiated with an ultraviolet light. The chlorinated polymer was precipitated by pouring the reaction mixture into methanol. An excess of trimethylamine passed into a solution of this polymer in tetrahydrofuran caused the polymer to precipitate. Methanol was added to give a free-flowing slurry and the solvent and excess trimethylamine removed by distillation under reduced pressure. Analysis showed that there was one quarternary nitrogen cationic group for every polyphenylene unit.

A solution of 1.1 g. of the quaternized polymer in 50 ml. of absolute alcohol was mixed with a solution of 1.28 g. of the lithium salt of TCNQ dissolved in 300 ml. of absolute alcohol, maintaining a nitrogen atmosphere. The reaction was allowed to continue for 2.5 hours at room temperature, by which time the polymer-TCNQ salt had completely precipitated. The precipitate was filtered by centrifugation and washed repeatedly with absolute alcohol and finally with ether and then in vacuum. The yield of the polymer-TCNQ salt was 1.13 g.

A film of this polymer containing 15% TCNQ was prepared as described in Eample 1. It had a conductivity of 6×10⁻⁵ mho/centimeter at 27° C.

*Example 7*

A commercially available 50% aqueous solution of the polymer of ethyleneimine (88 g.) was quaternized by diluting with 600 ml. of water and reacting with 290 g. of dimethylsulfate as described in Example 1. Analytical data indicated that at least 97% of the nitrogen atoms on the polymer had been quaternized. This quaternized polymer was converted to its TCNQ salt by reacting 0.8 g. of the quaternized polymer dissolved in 125 ml. of distilled water with 1.4 g. of the lithium salt of TCNQ dissolved in 125 ml. of distilled water, the reacting being carried out in a nitrogen atmosphere, at room temperature for 30 minutes, by which time the polymer-TCNQ salt had completely precipitated. After washing first with water followed by alcohol and then dry ether and dried in vacuum, a yield of 1.0 g. of the polymer-TCNQ salt was obtained.

A film of this polymeric TCNQ salt containing 15% TCNQ was prepared as described in Example 1. It had a conductivity of 5×10⁻⁴ mho/centimeter at 27° C.

*Example 8*

Poly(N-vinylimidazole) was prepared by bulk polymerization of 20 g. of N-vinylimidazole containing 0.07 g. of azobisisobutyronitrile by heating at 85° C. A solution of 3.4 g. of this polymer in 40 ml. of methanol was reacted with 10 ml. of methyl iodide. The reaction was carried out in the absence of light at a temperature of 90° C. with stirring for 3 hours adding water as required to maintain the polymer in solution. The reaction was continued overnight at room temperature. The polymer was precipitated from solution by adding 350 ml. of acetone. It was separated from the supernatant liquid by centrifugation and washing further with acetone and dried over phosphorus pentoxide at 80–85° C. at 15 mm. pressure. The yield of quaternized polymer was 7.1 g.

The quaternized polymer was converted to the polymer-TCNQ salt by reacting a solution of 0.48 g. of the quaternized polymer dissolved in 25 ml. of water with a solution of 0.42 g. of the lithium salt of TCNQ dissolved in 40 ml. of water. The reaction was carried out in a nitrogen atmosphere at room temperature for 0.5 hour by which time the polymer-TCNQ salt had completely precipitated. It was filtered from the solution and washed with water, until the washings were colorless, and then acetone and finally ether. It was dried in vacuum, yielding 0.57 g. of the polymer-TCNQ salt. A film of this polymer containing 15% TCNQ prepared as described in Example 1 had a conductivity of $5 \times 10^{-4}$ mho/centimeter at 27° C.

When an electric current is passed through these conductive films for a sufficient length of time to electrolyze the polymer-TCNQ salt, no loss in conductivity is noted, showing that the conductivity is electronic and not ionic.

The polymer-TCNQ salt mixture with TCNQ has a wide variety of applications, in addition to those previously mentioned. For example, the polymer-TCNQ salt described in Example 1 containing 15% of TCNQ was dissolved in dimethyl formamide to prepare a 5% solution. This solution was used as an adhesive to seal the leads of the transistor to a printed circuit board in place of metal solder. After evaporation of the solvent, the transistor was firmly attached to the printed circuit board. The radio incorporating this circuit board is still performing satisfactorily after 8 months since it was first assembled.

In another application, one side of an N-type semiconductor silicon wafer was provided with a gold layer. The other side of the wafer was coated with a solution of 0.08 g. of the polymer of Example 1 dissolved in 1 ml. of dimethyl formamide. A copper electrode was connected to the deposited polymer layer. This assembly showed an interesting non-linear current-voltage characteristic.

These and other modifications of this invention which will be readily discernible to those skilled in the art may be employed within the scope of the invention. The invention is intended to include all such modifications and variations as may be embraced within the following claims.

What we claim as new and desire to secure by Letters Patent of the United States is:

1. A composition comprising (1) a salt whose cation moiety is a soluble polymer having quaternary nitrogen cationic groups and whose anion moiety is the anion of 7,7,8,8-tetracyanoquinodimethan, and (2) a sufficient quantity of 7,7,8,8-tetracyanoquinodimethan, to give the composition a conductivity greater than $10^{-10}$ mho per centimeter.

2. The composition of claim 1 wherein the polymer forming the salt of (1) is a polymer of vinyl pyridine having quaternary nitrogen cationic groups.

3. The composition of claim 1 wherein the polymer forming the salt of (1) is a copolymer of styrene and vinyl pyridine having quaternary nitrogen cationic groups.

4. The composition of claim 1 wherein the polymer forming the salt of (1) is a polymer of amino-styrene having quaternary nitrogen cationic groups.

5. The composition of claim 1 wherein the polymer forming the salt of (1) is a polyphenylene ether having quaternary nitrogen cationic groups.

6. The composition of claim 1 wherein the polymer forming the salt of (1) is a polymer of N-vinyl imidazole having quaternary nitrogen cationic groups.

7. The composition of claim 1 wherein the polymer forming the salt of (1) is a polymer of N-vinyl imidazole having quaternary nitrogen cationic groups.

8. An article comprising a substrate of a material having electrical insulating properties having on its surface an adherent coating of a composition comprising (1) a salt whose cation moiety is a soluble polymer having quaternary nitrogen cationic groups and whose anion moiety is the anion of 7,7,8,8-tetracyanoquinodimethan, and (2) a sufficient quantity of 7,7,8,8-tetracyanoquinodimethan, to give the coating a conductivity greater than $10^{-10}$ mho per centimeter.

9. An electrical joint comprising two electrical conductors bonded together with a composition comprising (1) a salt whose cation moiety is a soluble polymer having quaternary nitrogen cationic groups and whose anion moiety is the anion of 7,7,8,8-tetracyanoquinodimethan, and (2) a sufficient quantity of 7,7,8,8-tetracyanoquinodimethan to give the composition a conductivity greater than $10^{-10}$ mho per centimeter.

10. An electrical joint comprising an electrical conductor and an inorganic semiconductor bonded together with a composition comprising (1) a salt whose cation moiety is a soluble polymer having quaternary nitrogen cationic groups and whose anion moiety is the anion of 7,7,8,8-tetracyanoquinodimethan, and (2) a sufficient quantity of 7,7,8,8-tetracyanoquinodimethan to give the composition a conductivity greater than $10^{-10}$ mho per centimeter.

11. The process of making an electronically conductive polymer which comprises adding a sufficient quantity of 7,7,8,8-tetracyanoquinodimethan to a salt whose cation moiety is a soluble polymer having quaternary nitrogen cationic groups and whose anion moiety is the anion of 7,7,8,8-tetracyanoquinodimethan to give the composition, when in the form of a solid, a conductivity greater than $10^{-10}$ mho per centimeter.

References Cited
UNITED STATES PATENTS 2,774,747   12/1957   Wolfson et al. _____ 260—32.8
3,140,342   7/1964    Ehrreich et al. _____ 174—35

OTHER REFERENCES

N. J. Juster: J. Chem., ed. 40, 547–555 (1963).
Lupinski et al., Science, 146, 1038–9 (1964).

WILLIAM H. SHORT, Primary Examiner.

M. GOLDSTEIN, Assistant Examiner.